(12) United States Patent
Hsing

(10) Patent No.: US 9,834,271 B1
(45) Date of Patent: Dec. 5, 2017

(54) VEHICLE WITH LEANING SUSPENSION SYSTEM

(71) Applicant: Michael Hsing, Saratoga, CA (US)

(72) Inventor: Michael Hsing, Saratoga, CA (US)

(73) Assignee: Michael Hsing, Saratoga, CA (US)

(*) Notice: Subject to any disclaimer, the term of this patent is extended or adjusted under 35 U.S.C. 154(b) by 0 days.

(21) Appl. No.: 15/202,206

(22) Filed: Jul. 5, 2016

Related U.S. Application Data

(60) Provisional application No. 62/343,972, filed on Jun. 1, 2016.

(51) Int. Cl.
*B62K 5/10* (2013.01)
*B62K 5/02* (2013.01)
*B62K 5/027* (2013.01)
*B62K 25/28* (2006.01)
*B62K 5/00* (2013.01)

(52) U.S. Cl.
CPC ............... *B62K 5/10* (2013.01); *B62K 5/02* (2013.01); *B62K 5/027* (2013.01); *B62K 25/28* (2013.01); *B62K 2005/001* (2013.01)

(58) Field of Classification Search
CPC ................. B62L 2005/001; B62K 5/02
See application file for complete search history.

(56) References Cited

U.S. PATENT DOCUMENTS

| | | | | |
|---|---|---|---|---|
| 4,003,443 A | * | 1/1977 | Boughers | B62D 61/08 180/217 |
| 4,360,224 A | * | 11/1982 | Sato | B62D 61/08 180/210 |
| 7,591,337 B2 | | 9/2009 | Suhre et al. | |
| 7,931,286 B2 | * | 4/2011 | Melcher | B60G 7/006 280/124.103 |
| 9,145,168 B2 | * | 9/2015 | Spahl | B62D 9/02 |
| 9,359,034 B2 | * | 6/2016 | Rasmussen | B62K 5/05 |
| 9,381,940 B2 | * | 7/2016 | Gale | B60G 21/073 |
| 9,487,234 B1 | * | 11/2016 | Matthies | B62D 9/02 |
| 9,493,205 B2 | * | 11/2016 | Ben Meir | B62K 15/00 |
| 9,623,928 B2 | * | 4/2017 | Mori | B62K 5/10 |
| 2002/0190494 A1 | * | 12/2002 | Cocco | B60G 21/007 280/124.135 |
| 2005/0040619 A1 | * | 2/2005 | Melcher | B60G 7/006 280/124.135 |

(Continued)

FOREIGN PATENT DOCUMENTS

| | | | | |
|---|---|---|---|---|
| CO | WO-2015166456 A1 | * | 11/2015 | ............. B62D 51/00 |
| JP | 2014162376 A | * | 9/2014 | ............. B60G 21/05 |
| WO | 2015/158976 A1 | | 10/2015 | |

*Primary Examiner* — Nicole T Verley
(74) *Attorney, Agent, or Firm* — Okamoto & Benedicto LLP

(57) ABSTRACT

A leaning suspension system for vehicles includes suspension arms that rotate about the same pivoting point. A swing frame also rotates about the same pivoting point. The center of gravity of the vehicle remains lower than the pivoting point even when the vehicle is leaning. A wheel mount assembly is rotatably mounted to a suspension arm. A shock absorber has an end that is connected to the wheel mount assembly and another end that is connected to the suspension arm. A control unit of the vehicle includes a computer that controls actuators of the leaning suspension system based on received sensor information. The vehicle can be a tricycle or a quadracycle.

14 Claims, 19 Drawing Sheets

(56) References Cited

U.S. PATENT DOCUMENTS

| | | | |
|---|---|---|---|
| 2007/0182120 A1 | 8/2007 | Tonoli et al. | |
| 2008/0197599 A1* | 8/2008 | Comstock | B62K 5/02 280/266 |
| 2008/0258415 A1* | 10/2008 | Melcher | B60G 7/006 280/124.103 |
| 2009/0108555 A1* | 4/2009 | Wilcox | B60G 7/008 280/93.51 |
| 2011/0275256 A1* | 11/2011 | Gibbs | B60F 3/0007 440/12.51 |
| 2012/0098225 A1 | 4/2012 | Lucas | |
| 2014/0312580 A1* | 10/2014 | Gale | B60G 21/073 280/5.509 |
| 2015/0021865 A1 | 1/2015 | Lin | |
| 2015/0061312 A1* | 3/2015 | Ishige | B62K 5/01 296/65.01 |
| 2015/0183484 A1* | 7/2015 | Aillet | B62K 5/01 280/62 |
| 2016/0229251 A1* | 8/2016 | Mori | B60G 13/003 |
| 2016/0229479 A1* | 8/2016 | Mori | B62K 5/10 |
| 2016/0229480 A1* | 8/2016 | Mori | B62D 9/02 |

\* cited by examiner

VEHICLE WITH LEANING SUSPENSION SYSTEM

CROSS-REFERENCE TO RELATED APPLICATION

This application claims the benefit of U.S. Provisional Application No. 62/343,972, filed on Jun. 1, 2016, which is incorporated herein by reference in its entirety.

BACKGROUND OF THE INVENTION

1. Field of the Invention

The present invention relates generally to leaning suspension systems for vehicles.

2. Description of the Background Art

Lightweight vehicles, such as tricycles and quadracycles, may incorporate a leaning suspension system to allow them to corner like a motorcycle. The leaning suspension system may include mechanisms to allow the vehicle to return to an upright position after leaning. Conventional leaning suspension systems, however, are based on overly complicated mechanical structures, which make the vehicle expensive to manufacture and difficult to maintain and repair. Conventional leaning suspension systems are also hard to adjust and optimize for different terrains, such as uneven surfaces and off-road conditions. Worse, vehicles that incorporate these leaning suspension systems can be very difficult to operate on extreme, uneven surfaces, such as stairs.

SUMMARY

In one embodiment, a leaning suspension system for vehicles includes suspension arms that rotate about the same pivoting point. A swing frame also rotates about the same pivoting point. The center of gravity of the vehicle remains lower than the pivoting point even when the vehicle is leaning. A wheel mount assembly is rotatably mounted to a suspension arm. A shock absorber has an end that is connected to the wheel mount assembly and another end that is connected to the suspension arm. A control unit of the vehicle includes a computer that controls actuators of the leaning suspension system based on received sensor information. The vehicle can be a tricycle or a quadracycle.

These and other features of the present invention will be readily apparent to persons of ordinary skill in the art upon reading the entirety of this disclosure, which includes the accompanying drawings and claims.

The use of the same reference label in different drawings indicates the same or like components. The drawings are not necessarily to scale.

DETAILED DESCRIPTION

In the present disclosure, numerous specific details are provided, such as examples of components and structures, to provide a thorough understanding of embodiments of the invention. Persons of ordinary skill in the art will recognize, however, that the invention can be practiced without one or more of the specific details. In other instances, well-known details are not shown or described to avoid obscuring aspects of the invention. For example, conventional joints (e.g., ball joints, rotary joints), supports, mounts, couplers, etc. are not shown or described for clarity of illustration.

Figure 1:
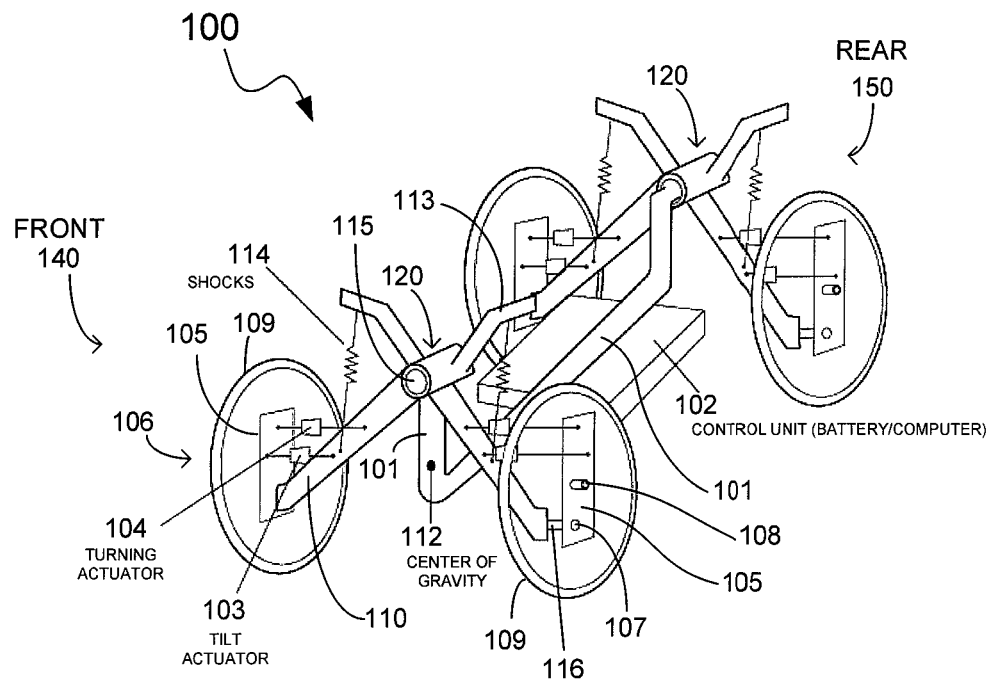
FIG. 1 shows a schematic diagram of a lightweight vehicle in accordance with an embodiment of the present invention.

FIG. 1 shows a schematic diagram of a lightweight vehicle 100 in accordance with an embodiment of the present invention. In the example of FIG. 1, the vehicle 100 is a quadracycle, i.e., has four wheels, with two wheels up front and two wheels at the rear. In other embodiments, the vehicle 100 is a tricycle, with two wheels up front and a single wheel at the rear. As can be appreciated, embodiments of the present invention may also be applied to other wheeled vehicles with leaning suspension.

In the example of FIG. 1, the vehicle 100 has a front section 140 and a rear section 150. The vehicle 100 has a swing frame 101, which swings about a pivoting point or axis 115. In the example of FIG. 1, the front section 140 and the rear section 150 are symmetrical. In that case, the swing frame 101 swings with one end on the pivoting point 115 on the front section 140 and another end on another pivoting point 115 on the rear section 150. In one embodiment, the swing frame 101 is a tubular frame comprising aluminum or other material. The swing frame 101 may have an exaggerated riser bar shape, with ends on the pivoting points 115 and a longitudinal middle section that is lower than the ends. The longitudinal middle section of the swing frame 101 may accommodate a control unit 102, a driver's seat (see FIG. 2, 201), and other components. The low longitudinal middle section of the swing frame 101 allows for a center of gravity that is lower than the pivoting point 115.

The control unit 102 may house a battery and other electrical components of the vehicle 100. In one embodiment, the control unit 102 includes a computer that receives steering and leaning inputs to control turning actuators 104, tilt actuators 103, and other electrical components. The vehicle 100 may be propelled using motorized means, such as one or more electric drive motors or an internal combustion engine, to drive the wheels. The vehicle 100 may also be human powered (e.g., pedal, crank, and gear arrangements). In general, the vehicle 100 may be propelled using any suitable conventional propulsion means without detracting from the merits of the present invention.

In the example of FIG. 1, a wheel assembly 106 comprises a tire 109 that is mounted on a wheel (e.g., disc or spoke/wheel frame) with a hub 108. In one embodiment, the tire 109 is a conventional two-wheel vehicle tire (e.g., motorcycle or bicycle), i.e., much narrower than a conventional car tire. The hub 108 is rotatably mounted on a wheel mount assembly that comprises a wheel plate 105. The wheel plate 105 may be pivotally mounted to a suspension arm 110, e.g., by way of a control bar 116 that is coupled to the wheel plate 105 by a ball joint 107. For increased stability, the portion of the suspension arm 110 that is connected to the wheel plate 105 is located below the hub 108. An extension bar 113 may be fixedly coupled to a suspension arm 110. A shock absorber 114 absorbs and damps shock impulses imparted on the vehicle, e.g., due to uneven surface. A shock absorber 114 and shock absorbers in general may include an accompanying actuator (e.g., electric/motor, pneumatic, hydraulic) to control and limit its movement and sensor for detecting its travel/position.

In one embodiment, a suspension arm 110 has a rotating end (e.g., cylindrical) that has the pivoting point 115 as its center. A rotating end of a right-side suspension arm 110 and a rotating end of a left-side suspension arm 110 are placed concentric to form the pivot joint assembly 120 with an end portion of the swing frame 101. An end portion of the swing frame 101 may serve as a shaft for the rotating ends of the suspension arms 110. The swing frame 101 and the suspension arms 110 may each independently swing about the pivoting point 115.

In the example of FIG. 1, the swing frame 101 has a longitudinal middle section that is lower than the pivoting point 115, allowing the center of gravity 112 of the vehicle 100 to always remain below the pivoting point 115 even when the vehicle 100 leans. This makes the vehicle 100 very stable when cornering and easier to return to the upright position.

Figure 2:
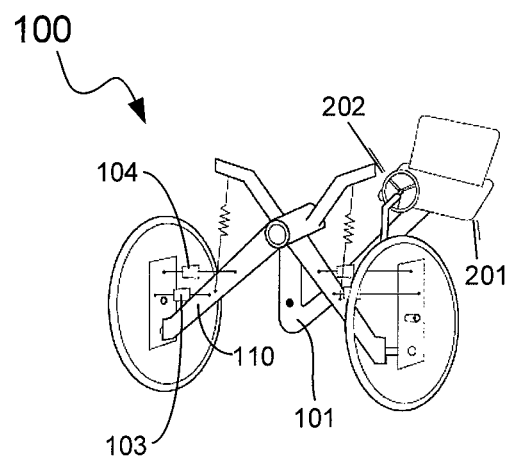
FIG. 2 is a schematic diagram of the vehicle of FIG. 1 in an embodiment where the vehicle is controlled using an electronic steering mechanism.

FIG. 2 is a schematic diagram of the vehicle 100 in an embodiment where the vehicle 100 is controlled using drive-by-wire technology. In the example of FIG. 2, turning the steering wheel 202 controls the turning actuators 104 to be synchronized to orient the wheel assemblies 106 to turn the vehicle 100 in the indicated direction. For example, inputs from the steering wheel 202 may be translated to an electronic signal (e.g., by an encoder) that is received by the control unit 102, which actuates the turning actuators 104 in a controlled manner to turn the vehicle 100 in the indicated direction.

A driver's seat 201 may be mounted on the longitudinal middle section of the swing frame 101. A driver may sit on the seat 201 and lean the vehicle 100 by leaning in the desired direction. The leaning of the driver may be sensed by an angle sensor, which generates a corresponding signal to the control unit 102 to actuate the tilt actuators 103 in a controlled manner to lean the vehicle 100 in the indicated direction. The leaning input may also be entered by way of a separate interface, such as a joystick. The force generated by the tilt actuators 103 may be calibrated to adapt to varying degrees of leaning inputs. For example, the tilt actuators 103 may be calibrated to apply stronger force when the driver is not too strong. This allows the driver to lean the vehicle 100 and return the vehicle 100 to the upright position with minimal input force.

Figure 3:
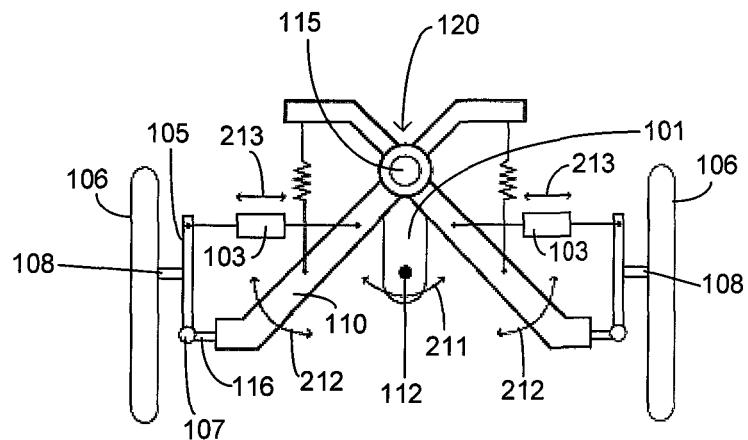
FIG. 3 shows the vehicle of FIG. 1 in an upright position.
Figure 4:
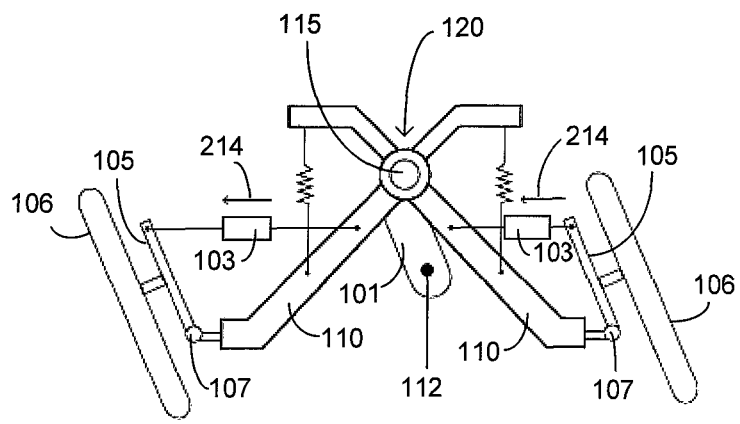
FIG. 4 shows the vehicle of FIG. 1 in a leaning state.
Figure 5:
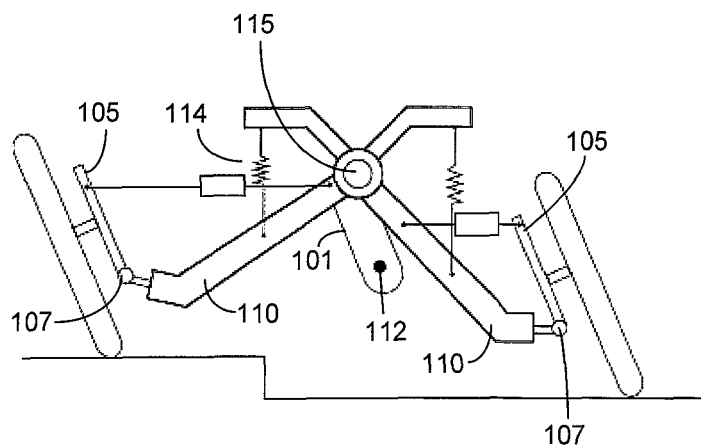
FIG. 5 shows the vehicle of FIG. 1 on an uneven surface in a leaning state.

FIGS. 3-5 schematically show front views of the vehicle 100 in accordance with an embodiment of the present invention. FIG. 3 shows the vehicle 100 in an upright position. In that case, the swing frame 101 is in a vertical orientation. The swing frame 101 rotatably swings (see arrow 211) about the pivoting point 115. The suspension arms 110 also rotate (see arrow 212) about the pivoting point 115. As shown in FIG. 3, a bar 116 may mechanically couple a wheel plate 105 to a suspension arm 110 by way of a ball joint 107. This allows the wheel plate 105, and thus the corresponding wheel assembly 106, to pivot on the ball joint 107 when the tilt actuator 103 extends or contracts (see arrows 213) to lean the vehicle 100 in response to a leaning input.

FIG. 4 shows the vehicle 100 leaning to the right (relative to the driver), and the swing frame 101 correspondingly rotates clockwise (from the driver's point of view) about the pivoting point 115. In that case, the tilt actuators 103 push the wheel plates 105 to the right (see arrows 214) to lean the wheel assemblies 106 to the right. The center of gravity 112 remains below the pivoting point 115 about which the swing frame 101 pivots to keep the vehicle 100 stable. FIG. 5 shows the vehicle 100 on an uneven surface, with the right side of the vehicle 100 being higher than the left side while leaning to the right. In that case, the right-side shock absorber 114 compresses to accommodate the swinging of the right-side wheel arm 110 about the pivoting point 115 to compensate for the higher surface. The wheel plates 105 pivot about the ball joints 107 to adapt to the surface. Again, the center of gravity 112 remains below the pivoting point 115. As can be appreciated, the vehicle 100 may also lean to the left in a similar manner.

Figure 6:
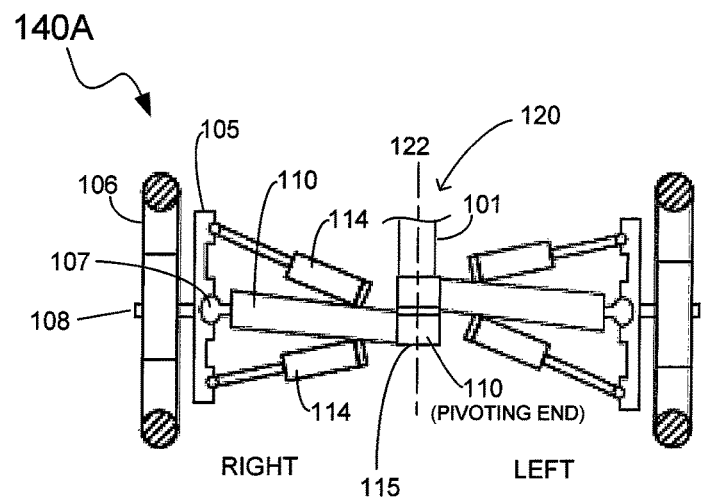
FIG. 6 shows a top view of a front section of a lightweight vehicle in accordance with an embodiment of the present invention.

FIG. 6 shows a top view of a front section 140A of a lightweight vehicle in accordance with an embodiment of the present invention. The front section 140A is a particular embodiment of the front section 140 (see FIG. 1). The following description of the front section 140A refers to the right front section of the vehicle. As can be appreciated, the description also applies to the left front section of the vehicle. Actuators and other electronic components, such as tilt and steering/turning actuators, are not shown for clarity of illustration.

In the example of FIG. 6, a pair of shock absorbers 114 are mounted on a suspension arm 100 on one end and on a wheel plate 105 on the other end. A ball joint 107 on the wheel plate 105 couples the wheel plate 105 to the suspension arm 110. A centerline 122 passes through the center of the rotating end of the suspension arm 110 and through the pivoting point 115. A pivot joint assembly is formed by the rotating ends of the right-side and left-side suspension arms 110, with the rotating ends being concentric. An end of the swing frame 101 is in line with the centerline 122. A hub 108 of the wheel assembly 106 is mounted to the wheel plate 105.

Figure 7:
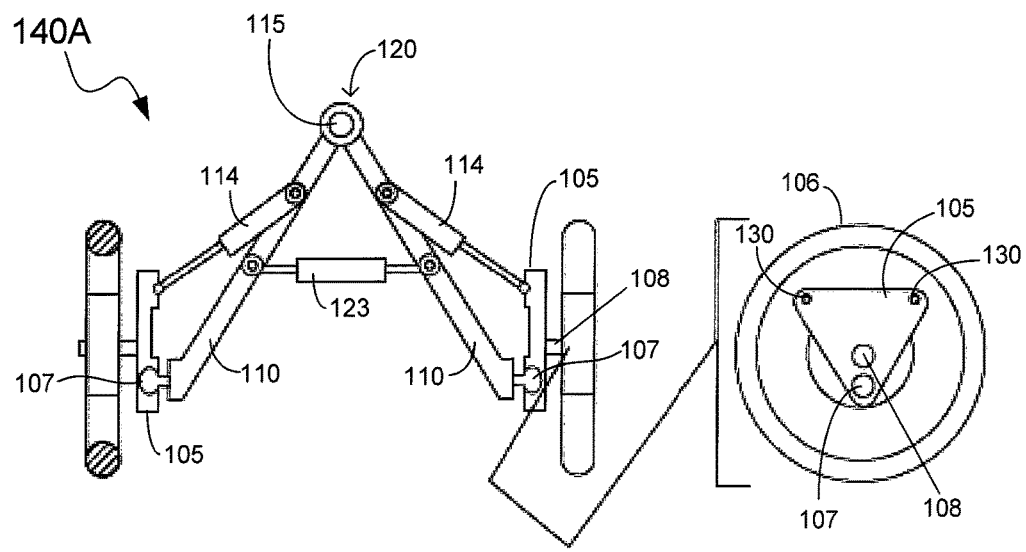
FIG. 7 shows a front view of the front section of FIG. 6 in accordance with an embodiment of the present invention.

FIG. 7 shows a front view of the front section 140A in accordance with an embodiment of the present invention. In the example of FIG. 7, the wheel plate 105 includes mounts 130 to which the pair of shock absorbers 114 are attached. A shock absorber 123 is attached to the right-side suspension arm 110 on one end and to the left-side suspension arm 110 on the other end. The ball joint 107 is mounted on a lower portion of the wheel plate 105 and the shock absorbers 114 are mounted on the upper portion of the wheel plate 105. In the example of FIG. 7, the wheel plate 105 is triangular, with the ball joint 107 being mounted on a lower corner of the triangle and the shock absorbers 114 being mounted on the upper corners of the triangle. FIG. 7 also shows other previously discussed components of the front section 140A.

Figure 8:
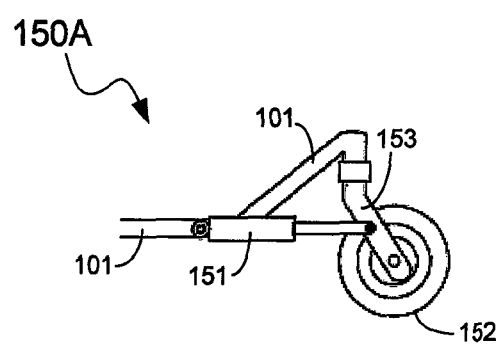
FIG. 8 shows a side view of a rear section of a lightweight vehicle in accordance with an embodiment of the present invention.
Figure 9:
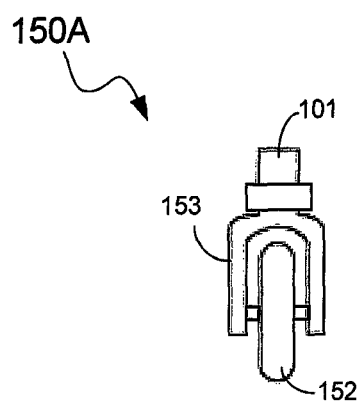
FIG. 9 shows a front view of the rear section of FIG. 8.

FIG. 8 shows a side view of a rear section 150A of a lightweight vehicle in accordance with an embodiment of the present invention. The rear section 150A is a particular embodiment of the rear section 150 (see FIG. 1). The rear section 150A is for a tricycle. In the example of FIG. 8, a shock absorber 151 is mounted on a swing frame 101 on one end and on a fork 153 on the other end. A wheel assembly comprising a tire 152 has a hub that is attached to the fork 153. FIG. 9 shows a front view of the rear section 150A.

Figure 10:
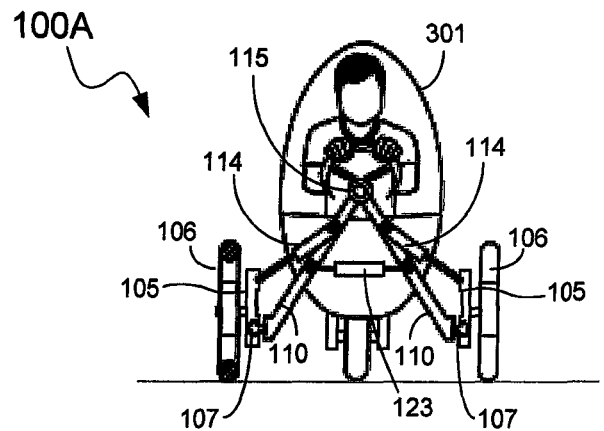
FIGS. 10-12 show front views of a lightweight vehicle in accordance with an embodiment of the present invention.
Figure 11:
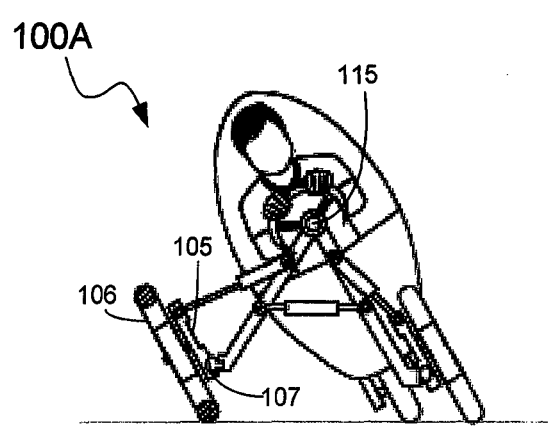
Figure 12:
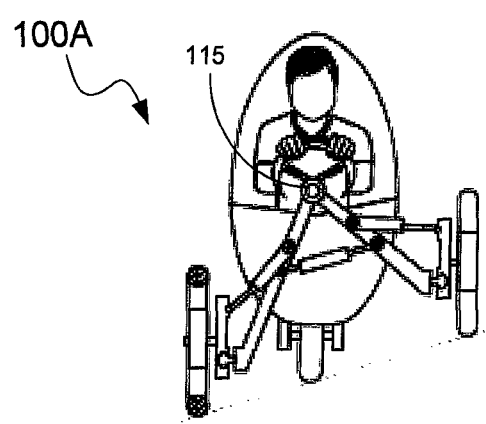
Figure 13:
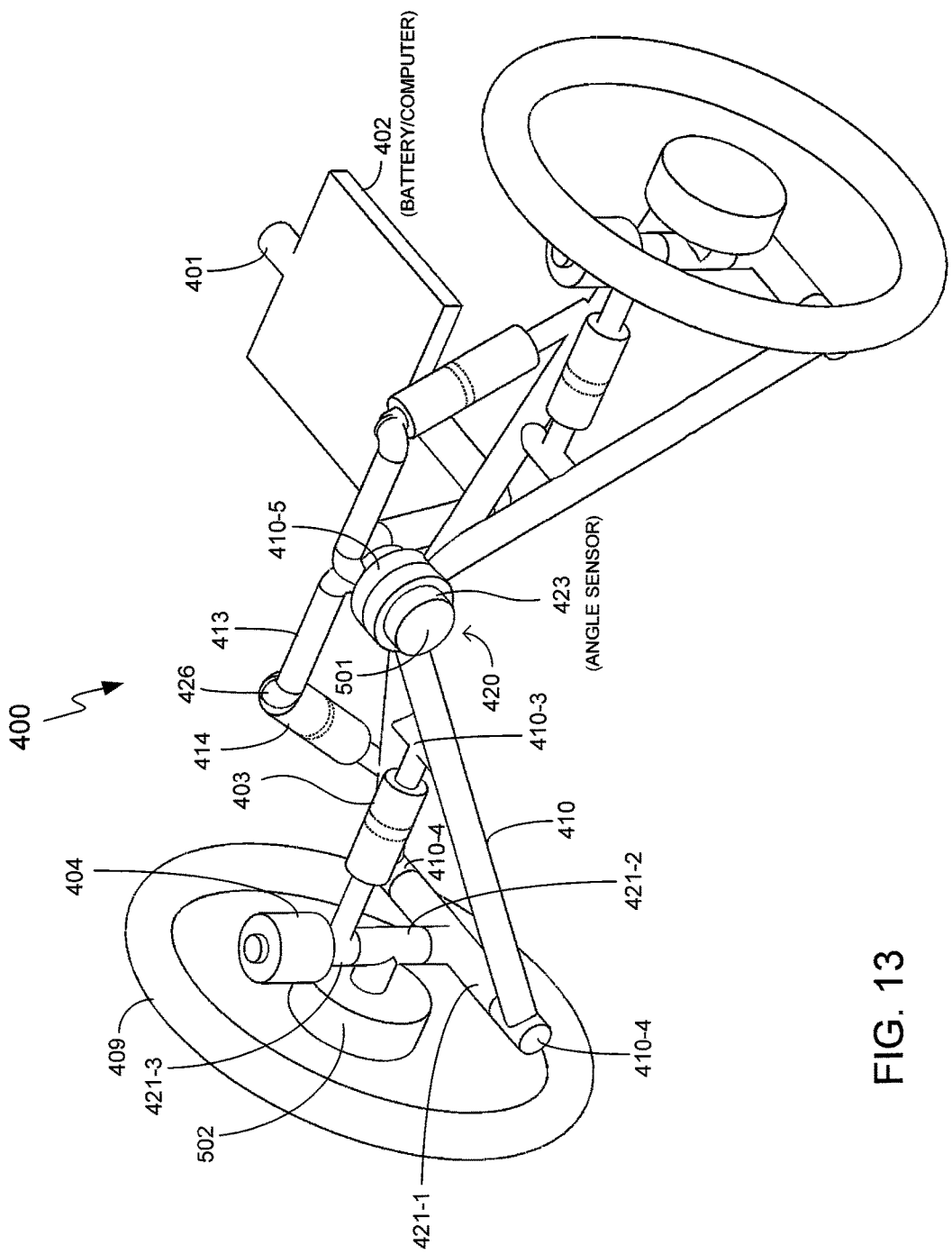
FIG. 13 shows a perspective view of a lightweight vehicle in accordance with an embodiment of the present invention.

FIGS. 10-12 show front views of a lightweight vehicle 100A in accordance with an embodiment of the present invention. The vehicle 100A is a particular embodiment of the vehicle 100 (see FIG. 1). The vehicle 100A is a tricycle that has a front section 140A and a rear section 150A. In the example of FIGS. 10-12, the vehicle 100A optionally includes an aerodynamic body shell 301. FIGS. 10-12 show previously described components.

In the example of FIG. 10, the vehicle 100A is in an upright position. In the example of FIG. 11, the vehicle 100A leans to the right on a level surface. In that case, the wheel plate 105 pivots on the ball joint 107 to lean the wheel assembly 106 to the right. The suspension arms 110 correspondingly swings about the pivoting point 115. In the example of FIG. 12, the vehicle 100A leans to the left on a sloping surface. The center of gravity of the vehicle 100A remains below the pivoting point 115 for increased stability when the vehicle 100A is not in an upright position.

FIGS. 13-18 show a two-wheel assembly of a lightweight vehicle 400 in accordance with an embodiment of the present invention. The two-wheel assembly of FIGS. 13-18 may employed as a front section or a rear section of the vehicle 400. In one embodiment, the two-wheel assembly has symmetrical left and right sides. Components on only one side are labeled for clarity of illustration.

In one embodiment, a swing frame 401 includes an end portion 423 (see also FIG. 14) that forms a pivot joint assembly 420 with the rotating ends 410-5 (see also FIG. 14) of a pair of suspension arms 410. The swing frame 401 swings freely about the pivoting point 501 of the pivot joint assembly 420. An angle sensor may be incorporated in the end portion 423 of the swing frame 401, in the rotating ends 410-5 of the suspension arms 410, or separately about the pivoting point 501 to allow a computer in the control unit 402 to detect the degree of rotation of the swing frame 401 about the pivoting point 501, and thus the leaning of the vehicle 400. A driver's seat (e.g., FIG. 2, 201) may be mounted over the control unit 402.

In one embodiment, a wheel mount assembly comprises a bottom portion 421-1, a wheel mounting portion 421-2, and a top portion 421-3. Ends 410-4 of a suspension arm 410 form a rotary joint with the bottom portion 421-1 of the wheel mount assembly (see also FIG. 15). A wheel assembly comprising a narrow tire 409 (e.g., a motorcycle or a bicycle tire) is rotated about a hub support of the wheel mounting portion 421-2 by an electric drive motor 502 and is turned by a turning actuator 404 (e.g., electric motor).

Figure 15:
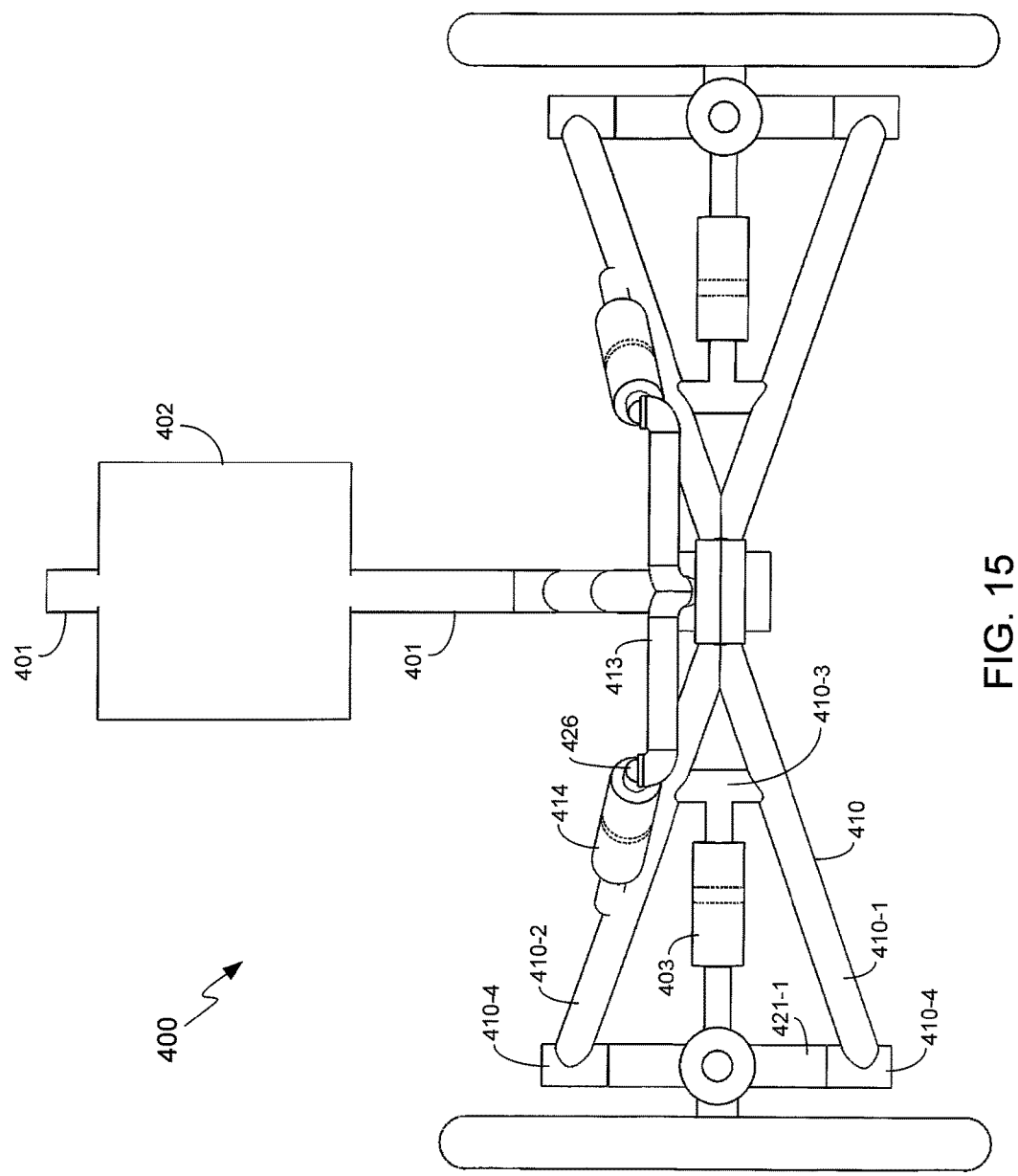
FIG. 15 shows a top view of the lightweight vehicle of FIG. 13.

In one embodiment, the bottom portion 421-1 of the wheel mount assembly and the side bars 410-1 and 410-2 of the suspension arm 410 form a triangle (see FIG. 15). One end of a tilt actuator 403 may be connected to a bar 410-3 of the suspension arm 410. The other end of the tilt actuator 403 may be connected to the top portion 421-3 of the wheel mount assembly.

In one embodiment, the swing frame 401 includes a shock mount 413. One end of a shock absorber 414 is connected to the shock mount 413 by way of a ball joint 426 and the other end of the shock absorber 414 is connected to the side bar 410-2 of the suspension arm 410 (see also FIG. 15).

The control unit 402 may house a battery, computer, and other electrical components of the vehicle 400. In one embodiment, the control unit 402 (e.g., its computer) receives a vehicle direction signal and angle sensor information, and controls the electric drive motors 502, the tilt actuators 403, and turning actuators 404. The vehicle direction signal may be input from a wireless remote source, a joy stick, or a steering wheel (e.g., see FIG. 2, 202).

Figure 14:
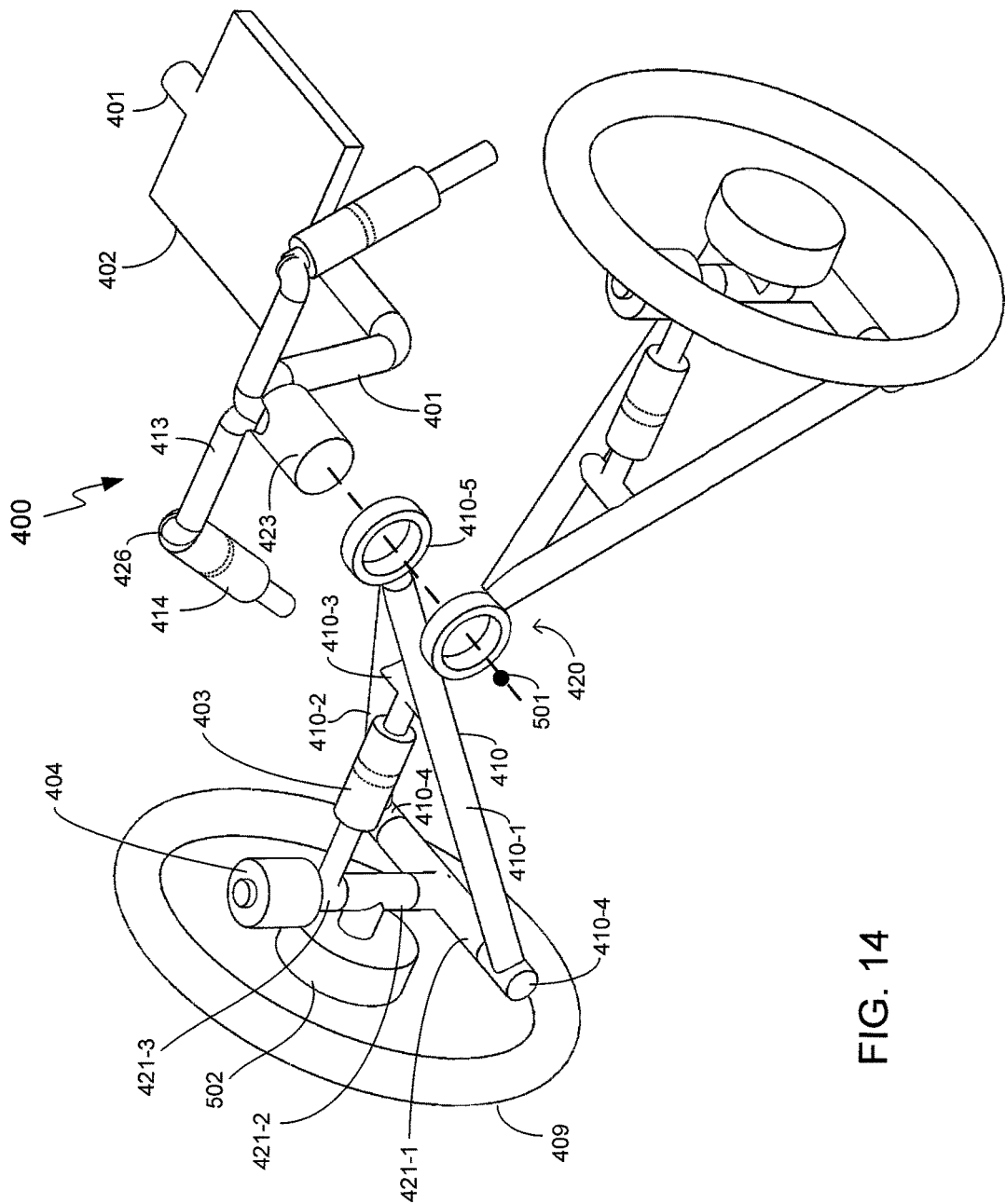
FIG. 14 shows an exploded view of the lightweight vehicle of FIG. 13.

FIG. 14 shows an exploded view of the vehicle 400 in accordance with an embodiment of the present invention. Notice the pivot joint assembly 420 formed by the end portion 423 of the swing frame 401 and the rotating ends 410-5 of the suspension arm 410. The pivoting point 501 is on a centerline that passes through the centers of the end portion 423 and the rotating ends 410-5. The other components of the vehicle 400 labeled in FIG. 14 have been described above in conjunction with FIG. 13.

FIG. 15 shows a top view of the vehicle 400 in accordance with an embodiment of the present invention. Notice the shock absorber 414 being connected to the shock mount 413 by way of the ball joint 426 on one end and connected to the side bar 410-2 of the suspension arm 410 on the other end. The other components of the vehicle 400 labeled in FIG. 15 have been previously described in conjunction with FIG. 13.

Figure 16:
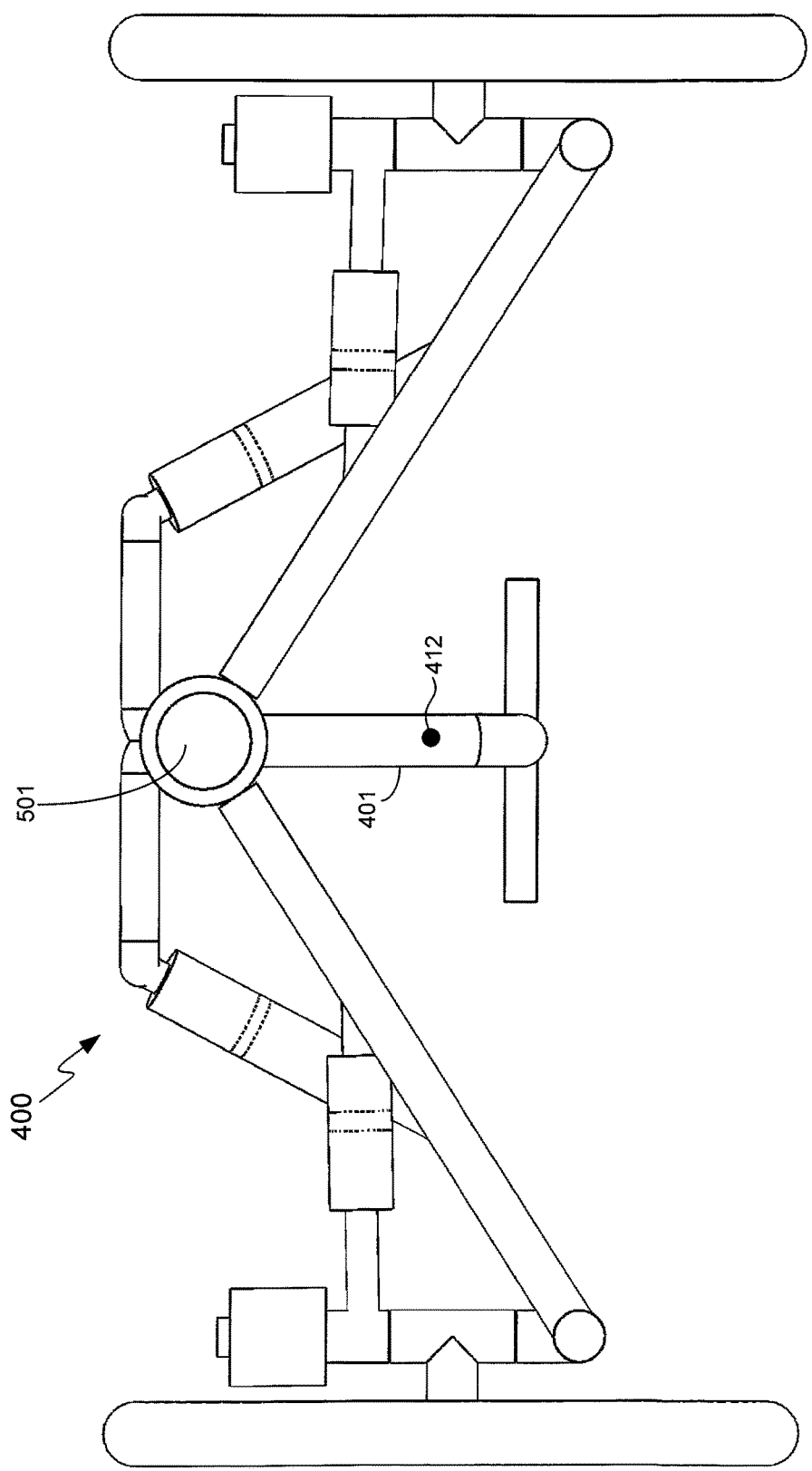
FIG. 16 shows a front view of the lightweight vehicle of FIG. 13.

FIG. 16 shows a front view of the vehicle 400 in accordance with an embodiment of the present invention. As in the vehicle 100 of FIG. 1, the swing frame 401 of the vehicle 400 has a longitudinal middle section that is lower than the pivoting point 501, allowing a center of gravity 412 of the vehicle 400 to always remain below the pivoting point 501 even when the vehicle 400 leans. This makes the vehicle 400 very stable when cornering and easier to return to the upright position.

More specifically, the center of gravity 412 of the vehicle 400 is always below the pivoting point 501. The swing frame 401, which is the main body of the vehicle 400, pivots freely at the pivoting point 501. When the vehicle 400 is turning, the swing frame 401 rotates outward about the pivoting point 501 in a direction that is opposite to the vehicle's turning direction. The rotation angle formed by the vehicle 400 while turning is governed by Newton's first law of motion. Based on the input vehicle direction signal and angle sensor signal, the control unit 402 calculates each wheel tilting and turning angle and sends control signals to the tilt actuators 403, turning actuators 404, and drive motors 502 to generate the right amount of tilt, turn, and drive motor speed/torque.

Figure 17:
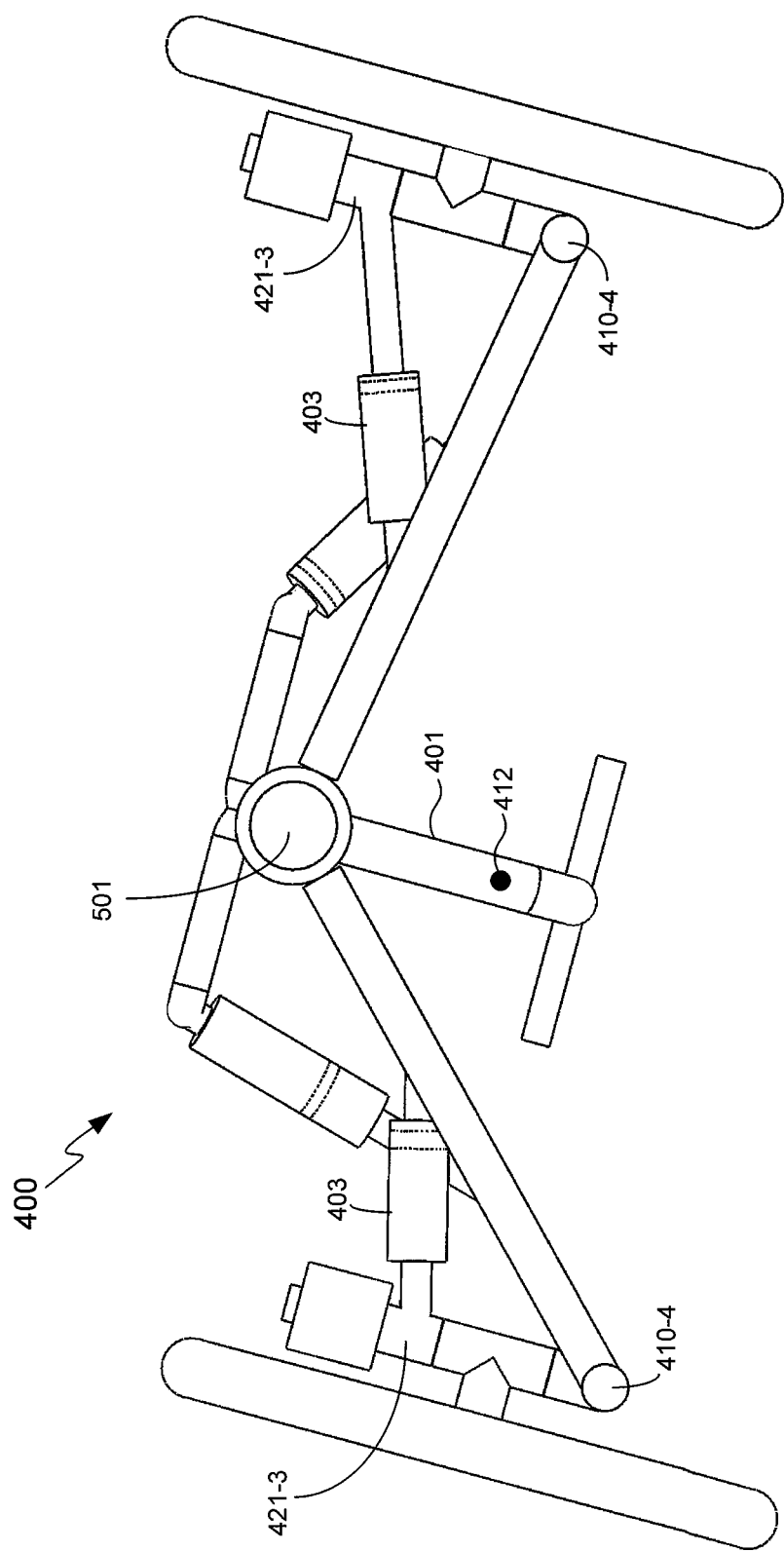
FIG. 17 shows the lightweight vehicle of FIG. 13 in a leaning state.

FIG. 17 shows the vehicle 400 leaning to the left (relative to the driver) and the swing frame 401 correspondingly rotates counter-clockwise (from the driver's point of view) about the pivoting point 501. In that case, the tilt actuators 403 rotates the top portions 421-3 of the wheel mount assemblies about the ends 410-4 of the suspension arm 410 to lean the vehicle 400 to the left. The center of gravity 412 remains below the pivoting point 501 about which the swing frame 401 pivots to keep the vehicle 400 stable. As can be appreciated, the vehicle 400 may also lean to the right in a similar manner.

Figure 18:
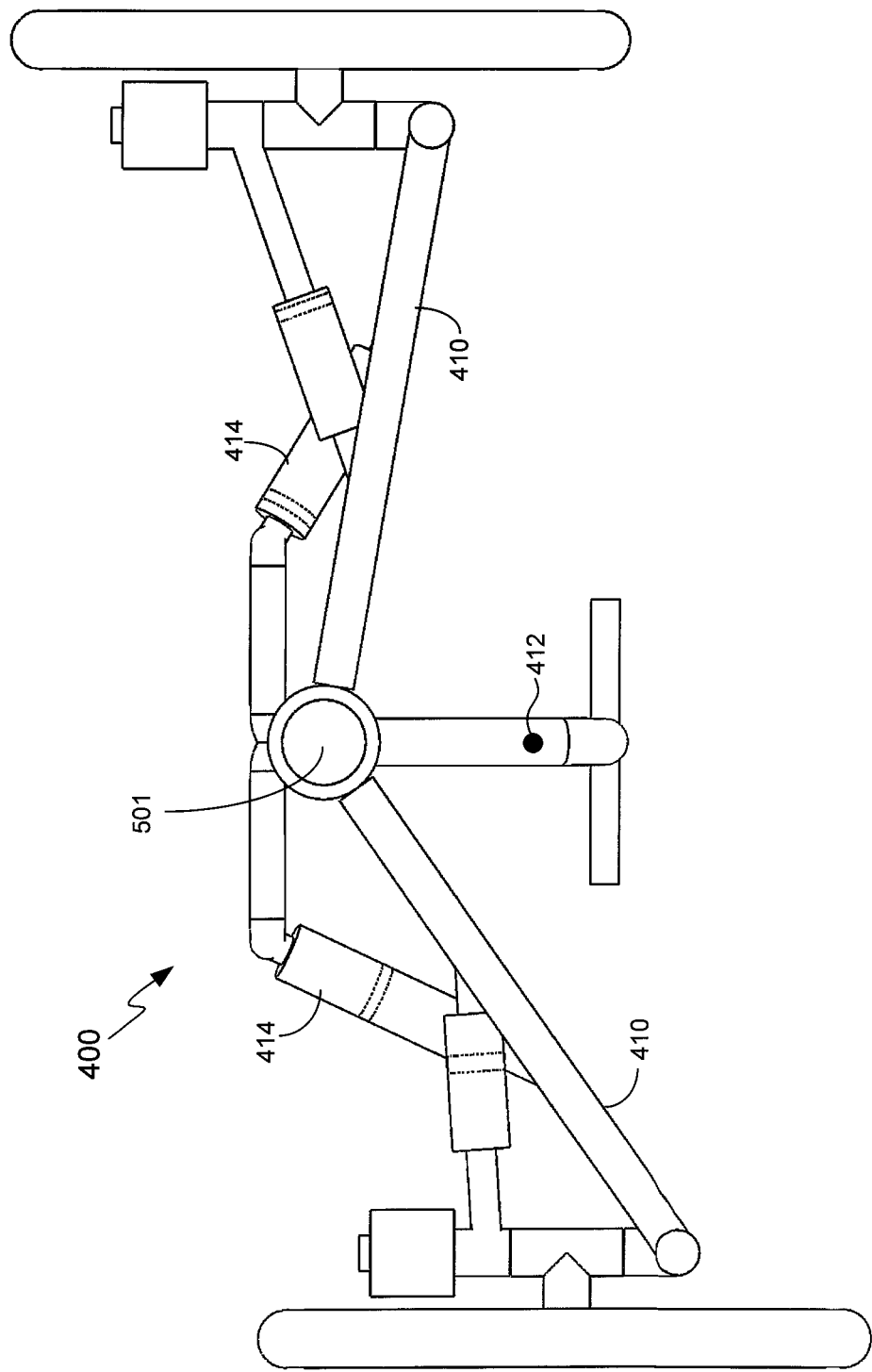
FIG. 18 shows the lightweight vehicle of FIG. 13 on an uneven surface.

FIG. 18 shows the vehicle 400 on an uneven surface, with the left side of the vehicle 400 being higher than the right side. In that case, the left-side shock absorber 414 compresses to accommodate the rising of the left-side suspension arm 410, which rotates about the pivoting point 501 to compensate for the higher left-side surface. Again, the center of gravity 412 remains below the pivoting point 501.

Figure 19:
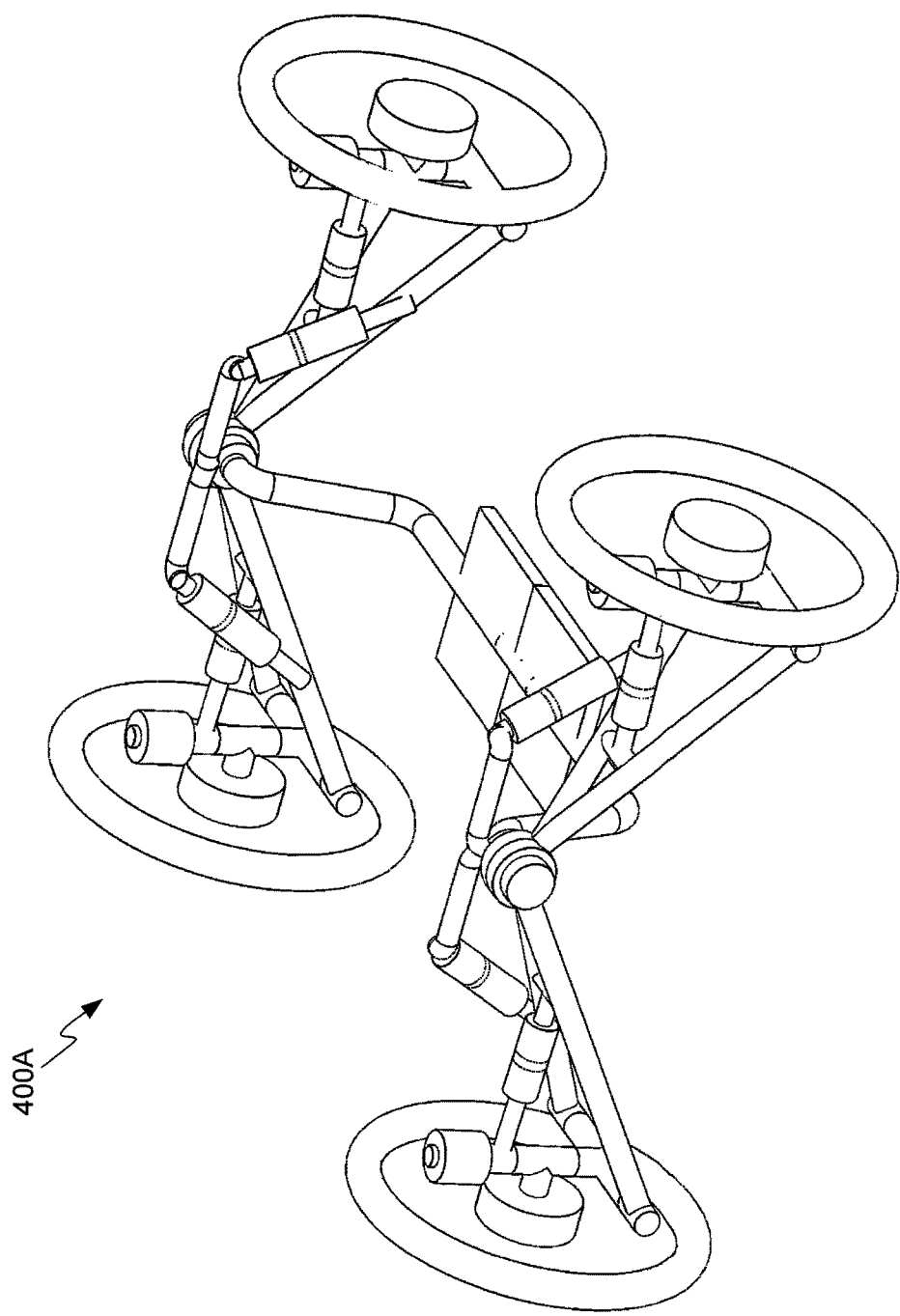
FIGS. 19-21 show perspective views of a lightweight vehicle in accordance with an embodiment of the present invention
Figure 20:
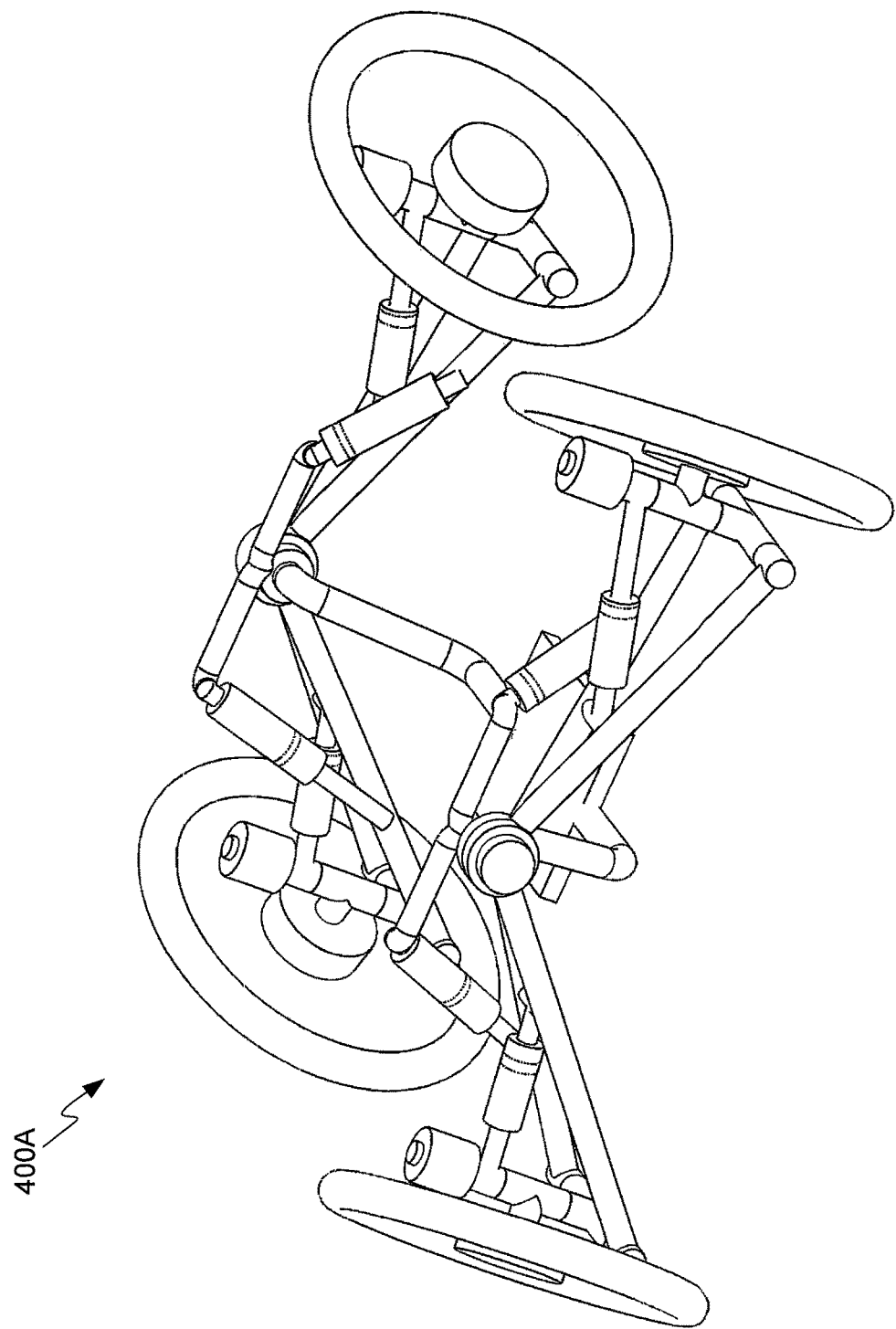
Figure 21:
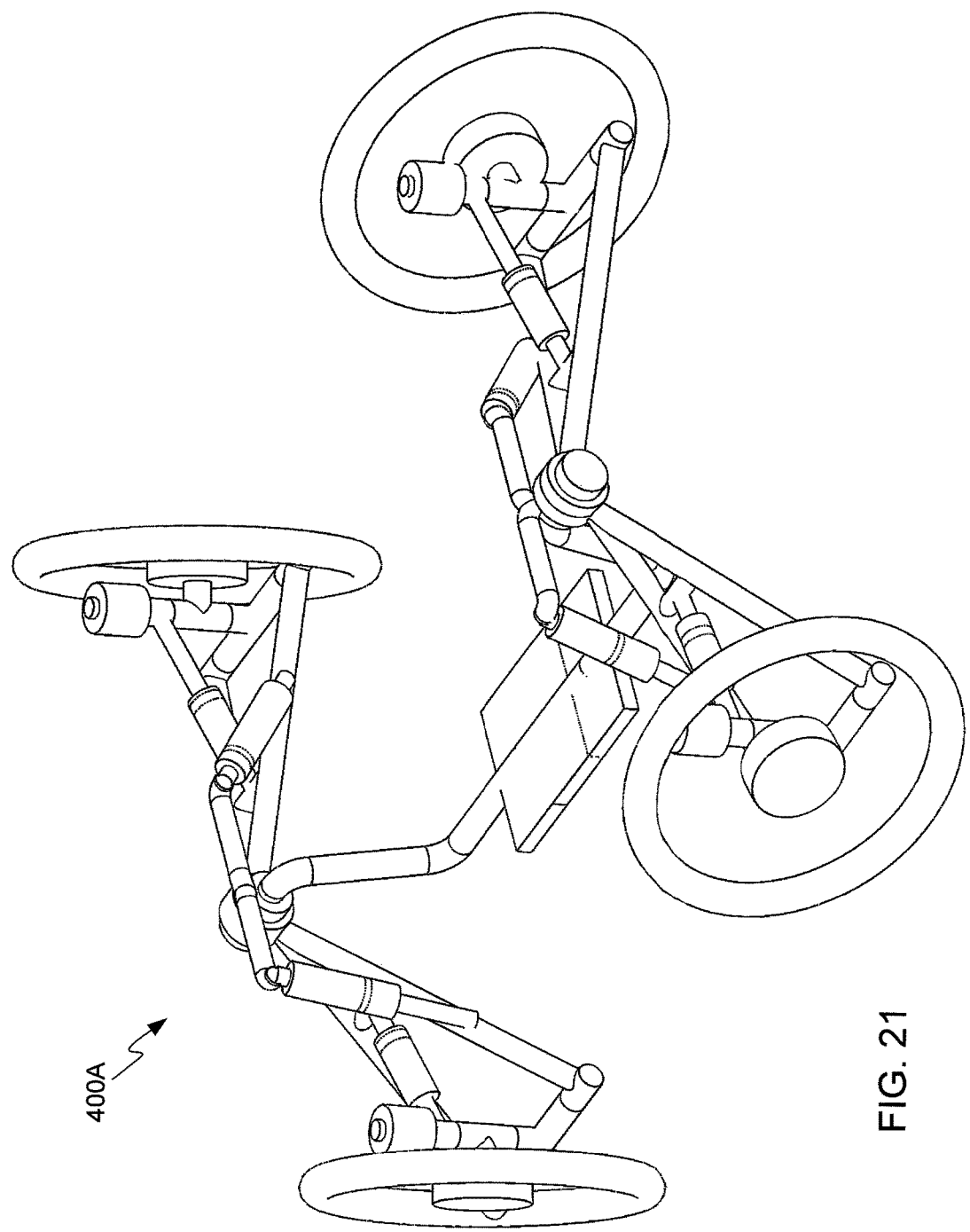

As can be appreciated, the vehicle 400 may be configured to have different front and rear sections. For example, FIGS. 19-21 show perspective views of a vehicle 400A, which is a vehicle 400 that is configured as a quadracycle, i.e., with two wheels in the front section and two wheels in the rear section. In one embodiment, the front and rear sections of the vehicle 400A are symmetrical. The vehicle 400A may thus comprise two two-wheel assemblies.

Figure 22:
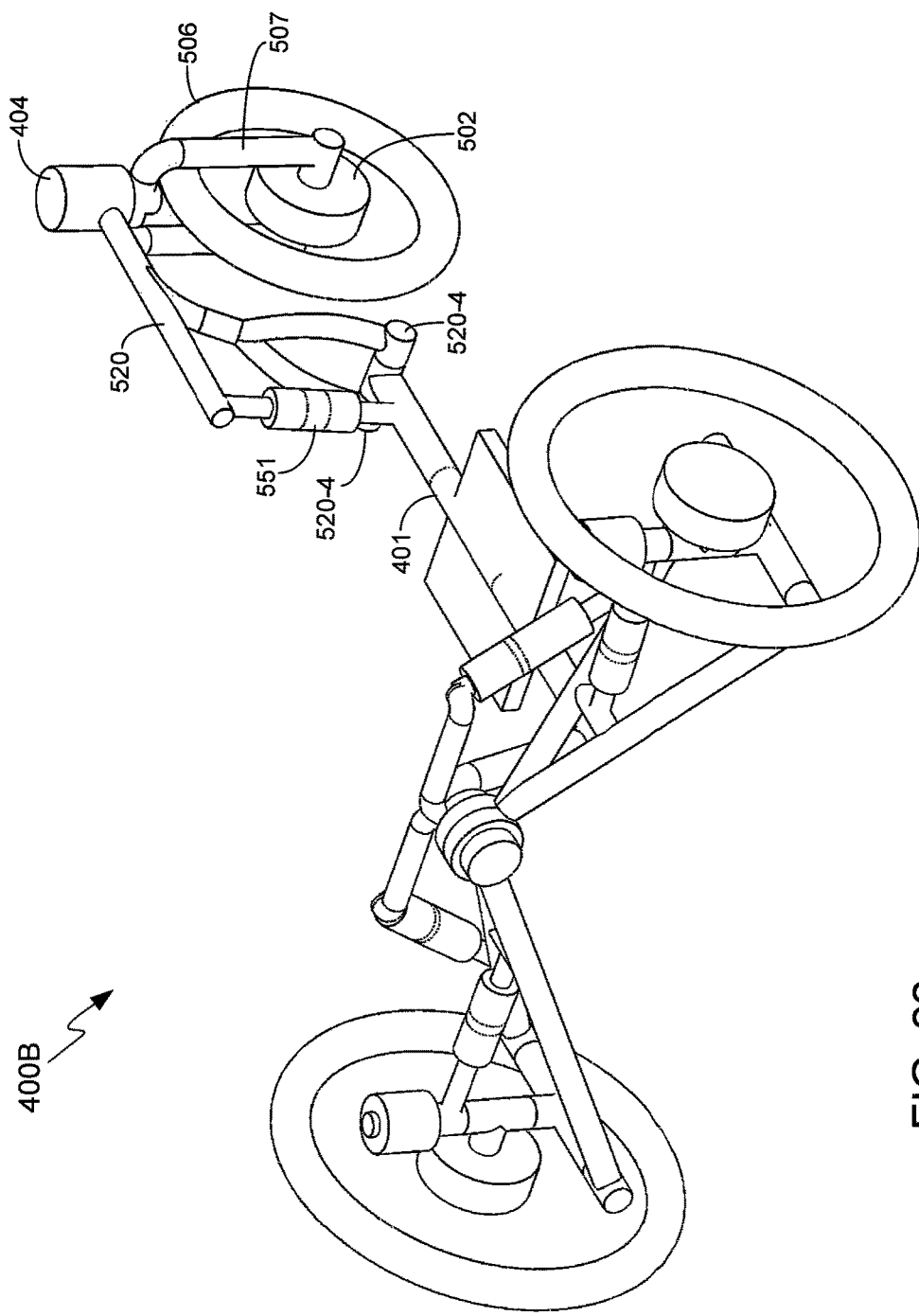
FIGS. 22-24 show perspective views of a lightweight vehicle in accordance with an embodiment of the present invention.
Figure 23:
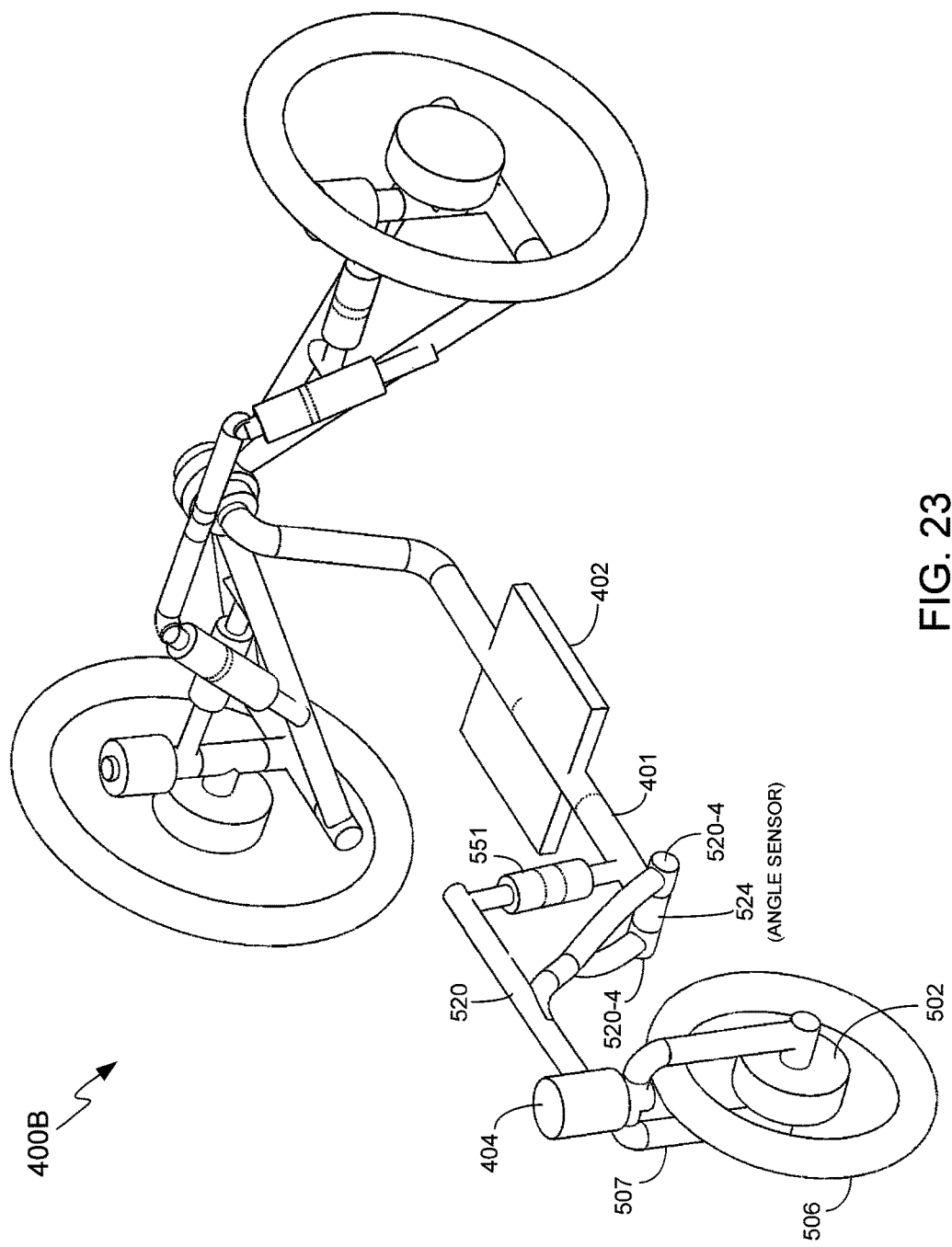
Figure 24:
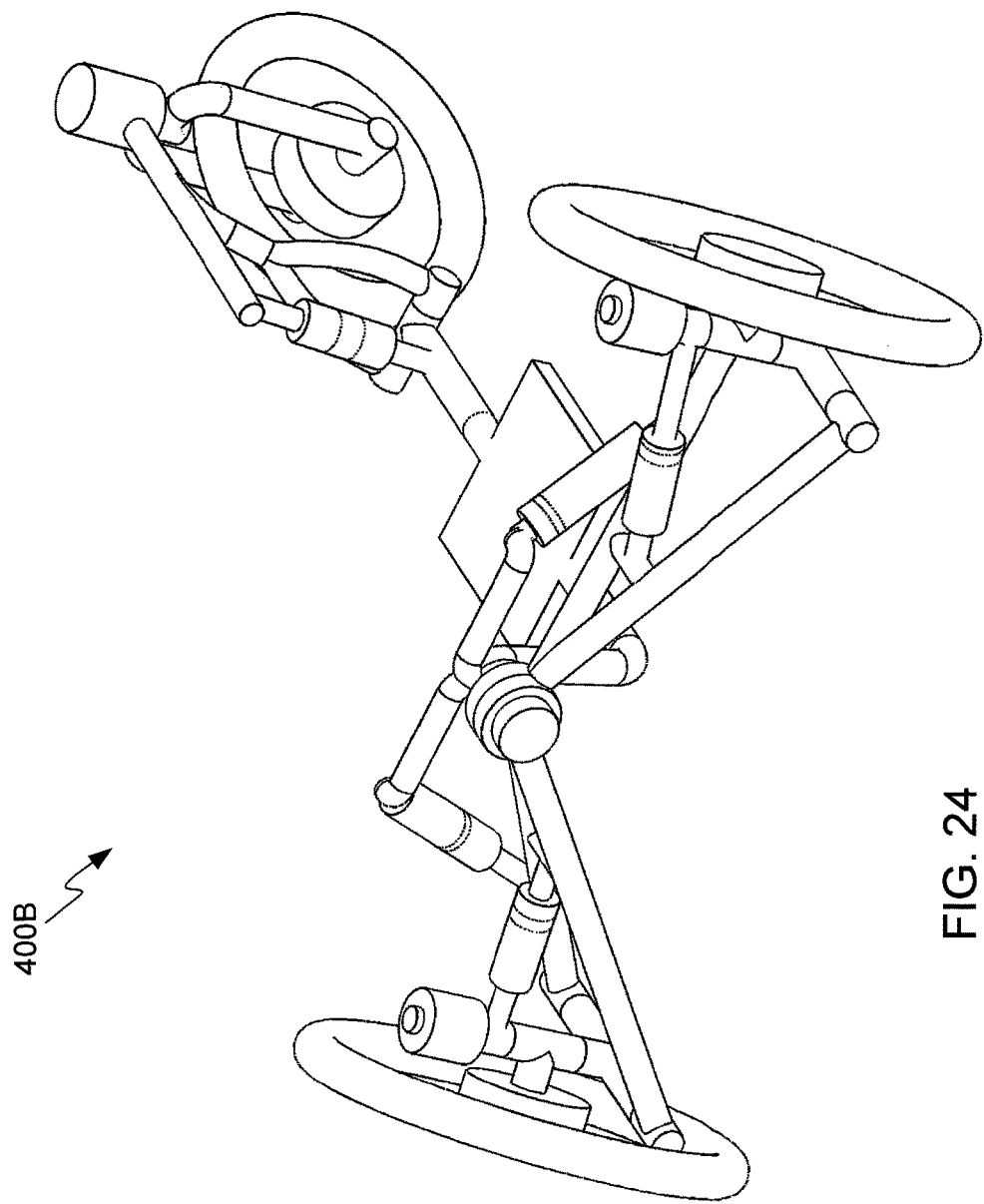
Figure 25:
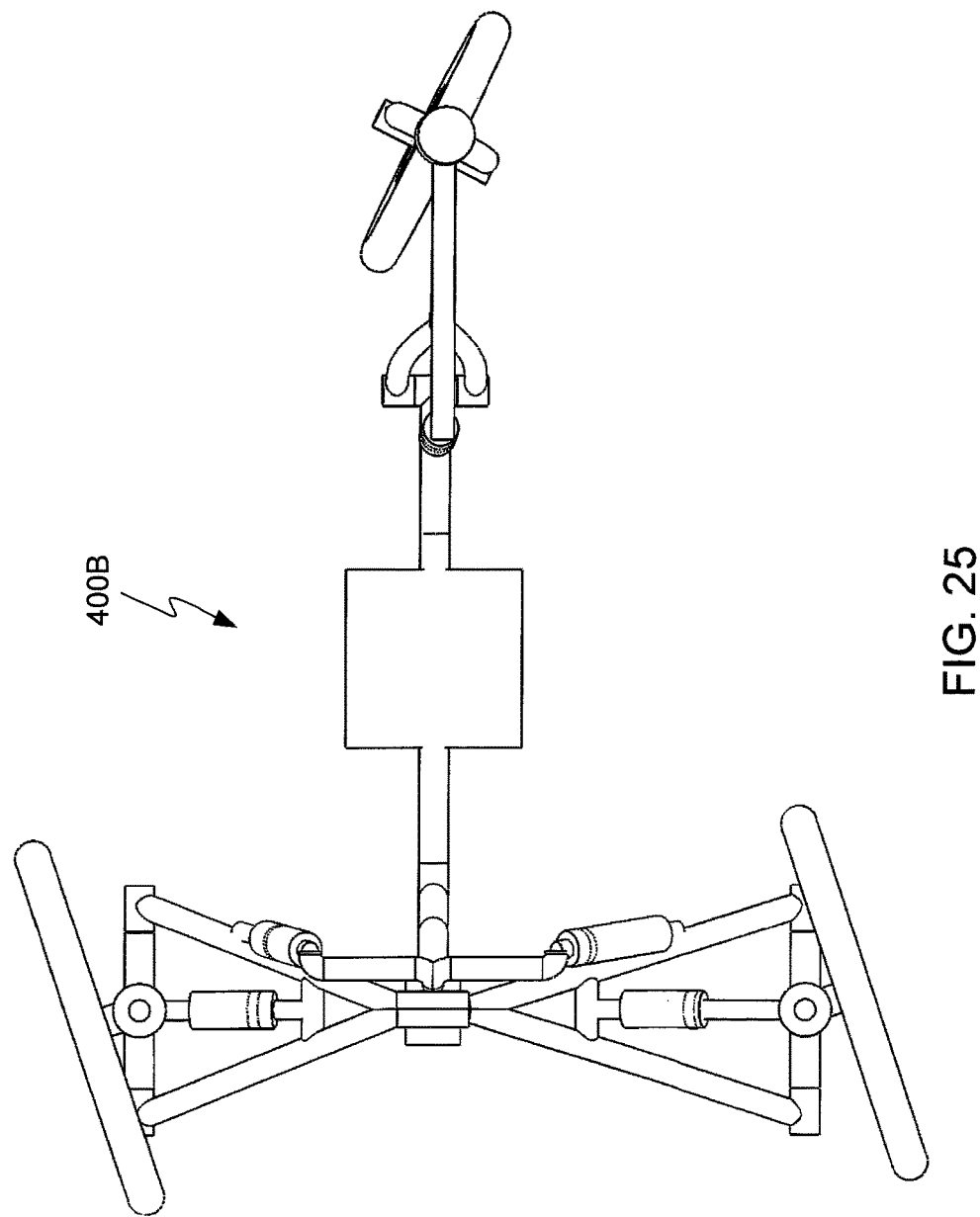
FIG. 25 shows a top view of the lightweight vehicle of FIGS. 22-24.

As another example, FIGS. 22-24 show perspective views of a lightweight vehicle 400B, which is a lightweight vehicle 400 that is configured as a tricycle, with a two-wheel assembly on one end and a single-wheel assembly on the other end. FIG. 25 shows a top view of the vehicle 400B.

Referring to FIG. 22, in one embodiment, the single-wheel assembly of the vehicle 400B has a control frame 520. One end of a shock absorber 551 is connected to a top portion of the control frame 520 and the other end of the shock absorber 551 is connected to the swing frame 401. The control frame 520 includes rotating ends 520-4 that allow the control frame 520 to rotate about the end portion 524 (see FIG. 23) of the swing frame 401 to push and pull the shock absorber 551 as dictated by the surface. An angle sensor (see FIG. 23, at 524) may be incorporated in the end portion 524 or about the rotating ends 520-4 to allow the control unit 402 to detect the degree of rotation of the control frame 520 relative to the swing frame 401.

In one embodiment, the single-wheel assembly of the vehicle 400B includes a turning actuator 404, such as an electric motor. The turning actuator 404 rotatably drives a fork 507, on which a wheel assembly comprising a tire 506 is mounted. The control unit 402 may receive angle information (e.g., from an angle sensor in the end portion 524) and send control signals to the turning actuator 404 and an electric drive motor 502, which drives the wheel assembly.

Figure 26:
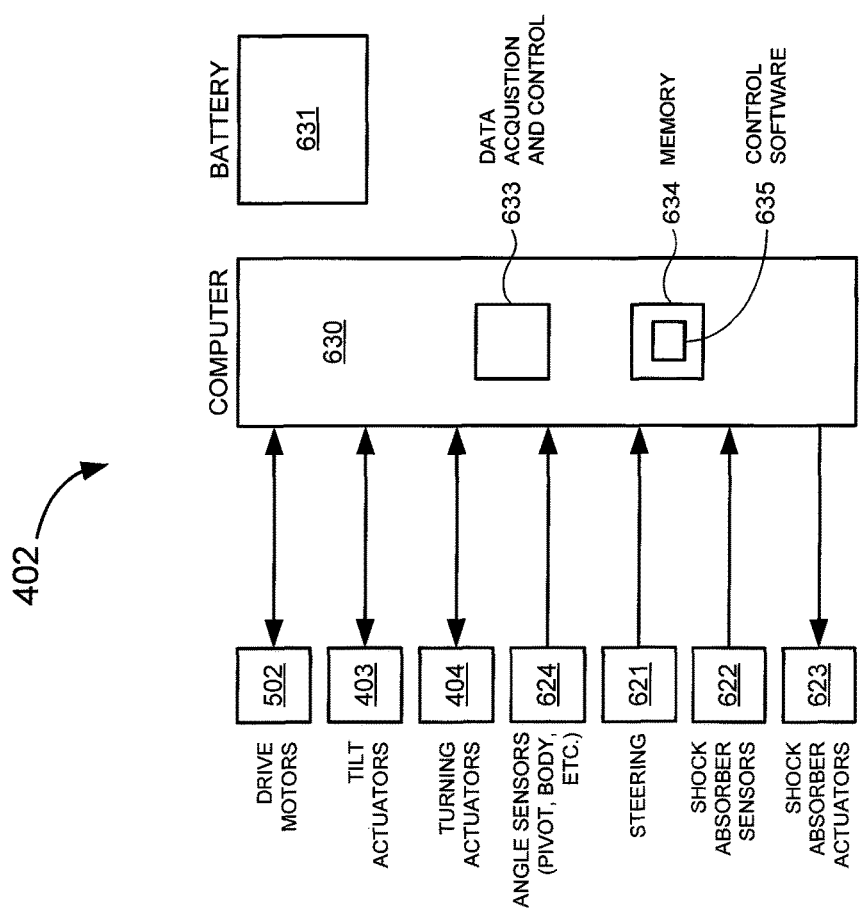
FIG. 26 shows a schematic diagram of a control unit in accordance with an embodiment of the present invention.

FIG. 26 shows a schematic diagram of the control unit 402 in accordance with an embodiment of the present invention. In the example of FIG. 26, the control unit 402 comprises an on-board computer 630 and a battery 631. Other electrical components, such as lights, turning signals, associated controllers, etc., are not shown for clarity of illustration.

In one embodiment, electric drive motors 502, tilt actuators 403, turning actuators 404, angle sensors 624 (e.g., pivot angle sensor, body angle sensor), steering input 621, shock absorber sensors 622, shock absorber actuators 623, etc. are electrically coupled to the computer 630. The computer 630 may be a microcontroller with integrated memory 634 and data acquisition and control circuits 633. The computer 630 may also be a general purpose processor with separate memory 634 and data acquisition and control circuits 633. The memory 634 may comprise volatile memory for running processes of the control software 635 and non-volatile memory (e.g., flash) for storing calibration, initialization, and personalization data.

The computer 630 generates control signals to control the electrical motors 502 (e.g., speed), tilt actuators 403 (e.g., travel limit), turning actuators 404 (e.g., turning direction, lean direction), and shock absorber actuators 623 (e.g., travel limit, ride quality). The computer 630 receives sensor signals from the drive motors 502 (e.g., rotational speed, applied torque), angle sensors 624 (e.g., pivot angle body, angle), steering inputs 621 (e.g., from steering wheel, joystick).

The computer 630 may be calibrated to remember the zero-degree tilt angle of the vehicle (e.g., vehicle 400). In the case of a vehicle with four wheels, the vehicle may be mechanically symmetrical. In the case of a vehicle with three wheels, the vehicle may be configured to have two wheels up front and one wheel at the back. In either case, each wheel operation, such as turning, tilting, and speed may be different depending on the direction the vehicle is traveling. The control software 635 may be optimized for each wheel operation based on the direction of the vehicle.

To turn the vehicle, the driver or a remote source initiates a directional input, which is translated to a direction signal that is received by the computer 630 as a steering input 621. The computer 630 may calculate and set: (a) the right amount of turning, speed, and torque for each wheel based on Newton's laws of motion; (b) each wheel speed, directional tracking angle (steering angle) and height (shock absorber travel); (c) the vehicle's main body tilt angle; and (d) a set of pre-determined values, such as vehicle weight, tilting limits, suspension position limits, wheel speed limits, ground-to-tire friction coefficient, number of wheels in operation, etc.

The computer 630 may calculate the correct amount of tilting for each wheel based on the vehicle main body tilt angle and Newton's laws of motion and a set of pre-determined values, such as vehicle weight, tilting limits, suspension travel limits, wheel speed limits, ground-to-tire friction, number of wheels in operation or not etc. For example, the computer 630 may control a tilt actuator 403 based on an angle formed by the swing frame relative to the pivoting point.

The computer 630 may determine the optimized values for each wheel based on each wheel's speed and tracking direction and the overall vehicle tracking direction. Turning, tilting, and wheel speed limits may be dynamically set by the computer 230 based on a set of predetermined values, as such weight, tire friction coefficient, and Newton's laws of motion.

The vehicle 400 provides many advantages heretofore unrealized. First, the vehicle 400 is very stable during cornering because of its low center of gravity. Second, the side G-force applied on the main body of the vehicle 400 and on the driver is reduced, thereby enhancing controllability of the vehicle 400. Third, the tilting mechanism of the vehicle 400 allows for reduced tire width. The tire ground contacting area changes with tilting angle around the tire similar to a motorcycle. With a narrow tire, wheel rotating friction with the ground is reduced for improved efficiency. Fourth, because wheel torque, wheel speed, wheel spinning direction, tilting, and turning are controlled by the control unit 402, i.e., computer-controlled, all safety limits can be preset by software according to surface conditions. The vehicle 400 can thus be automatically controlled to avoid turnover and sliding. Fifth, being electrical and software controlled, the vehicle 400 can be very versatile. The vehicle 400 can be configured to have one front wheel and two back wheels or two front wheels and one back wheel with no or very little mechanical changes. Sixth, with the combination of forward and backward wheel spinning and all wheel turning control, the turning radius of the vehicle 400 can be set to zero or near zero degree. Seventh, during manufacturing, mechanical adjustments can be eliminated or minimized. The vehicle 400 may be configured to be self-tuning by pre-programming the control unit 402.

Leaning suspension systems for lightweight vehicles have been disclosed. While specific embodiments of the present invention have been provided, it is to be understood that these embodiments are for illustration purposes and not limiting. Many additional embodiments will be apparent to persons of ordinary skill in the art reading this disclosure.

What is claimed is:

1. A leaning suspension system for a vehicle, the leaning suspension system comprising:
    a first suspension arm having a first end and a second end;
    a second suspension arm having a first end and a second end, the second end of the first suspension arm and the second end of the second suspension arm being concentric at a pivoting point, each of the first and second suspension arms independently rotates about the pivoting point;
    a first wheel mount assembly that is rotatably coupled to the first end of the first suspension arm;
    a second wheel mount assembly that is rotatably coupled to the first end of the second suspension arm;
    a swing frame that is rotatably coupled to the first and second suspension arms and swings about the pivoting point;
    a driver's seat that is mounted on the swing frame;
    a control unit comprising a computer that controls an actuator of the leaning suspension system; and
    a first shock absorber having a first end that is connected to the first suspension arm and a second end that is connected to the first wheel mount assembly.

2. The leaning suspension system of claim 1, further comprising:
    a first wheel assembly comprising a tire, the first wheel assembly being mounted on the first wheel mount assembly; and
    a second wheel assembly comprising a tire, the second wheel assembly being mounted on the second wheel mount assembly.

3. The leaning suspension system of claim 2, further comprising:
    a first joint that couples the first wheel mount assembly to the first suspension arm.

4. The leaning suspension system of claim 3, wherein the first joint comprises a ball joint.

5. The leaning suspension system of claim 3, wherein the first joint comprises a rotary joint.

6. The leaning suspension system of claim 1, further comprising:
    a second shock absorber having a first end that is connected to the second suspension arm and a second end that is connected to the second wheel mount assembly.

7. The leaning suspension system of claim 6, wherein the actuator comprises a tilt actuator.

8. The leaning suspension system of claim 7, further comprising an electric drive motor that is controllable by the control unit.

9. The leaning suspension system of claim 1, wherein the leaning suspension system is at a rear end of the vehicle.

10. The leaning suspension system of claim 1, wherein the vehicle is a quadracycle.

11. A leaning suspension system for a vehicle, the leaning suspension system comprising:
    a first suspension arm;
    a second suspension arm, wherein the first suspension arm and the second suspension arm independently rotate about a same pivoting point;
    a first wheel mount assembly that is pivotally mounted to the first suspension arm;
    a second wheel assembly that is pivotally mounted to the second suspension arm;
    a first shock absorber having a first end that is mounted to the first suspension arm and a second end that is mounted to the first wheel mount assembly;
    a second shock absorber having a first end that is mounted to the second suspension arm and a second end that is mounted to the second wheel mount assembly; and
    a swing frame that swings about the same pivoting point.

12. The leaning suspension system of claim 11, further comprising:
    a control unit comprising a computer configured to control tilting of the vehicle.

13. The leaning suspension system of claim 11, wherein the vehicle is a quadracycle.

14. A leaning suspension system for a vehicle, the leaning suspension system comprising:
    a first suspension arm having a first end and a second end;
    a second suspension arm having a first end and a second end, the second end of the first suspension arm and the second end of the second suspension arm being concentric at a pivoting point, each of the first and second suspension arms independently rotates about the pivoting point;
    a first wheel mount assembly that is rotatably coupled to the first end of the first suspension arm;
    a second wheel mount assembly that is rotatably coupled to the first end of the second suspension arm;
    a swing frame that is rotatably coupled to the first and second suspension arms and swings about the pivoting point;
    a driver's seat that is mounted on the swing frame; and
    a control unit comprising a computer that controls an actuator of the leaning suspension system,
    wherein the leaning suspension system is at a rear end of the vehicle.

* * * * *